Nov. 12, 1946.  A. A. JOHNSON  2,411,094
WINCH FOR TOWING AND THE LIKE
Filed Sept. 9, 1941  3 Sheets-Sheet 1

INVENTOR.
Almon A. Johnson.
BY Watts C. Ross, Attorney.

Nov. 12, 1946.  A. A. JOHNSON  2,411,094
WINCH FOR TOWING AND THE LIKE
Filed Sept. 9, 1941  3 Sheets-Sheet 2
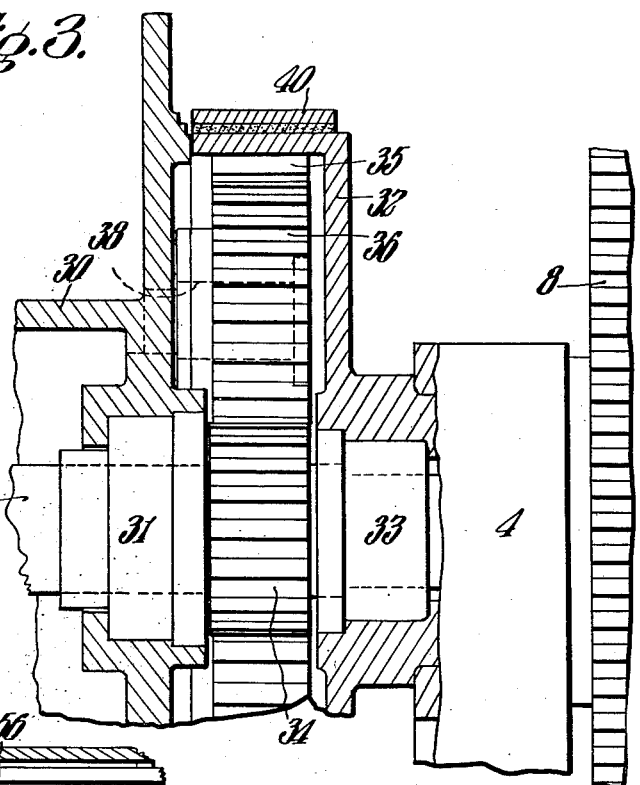
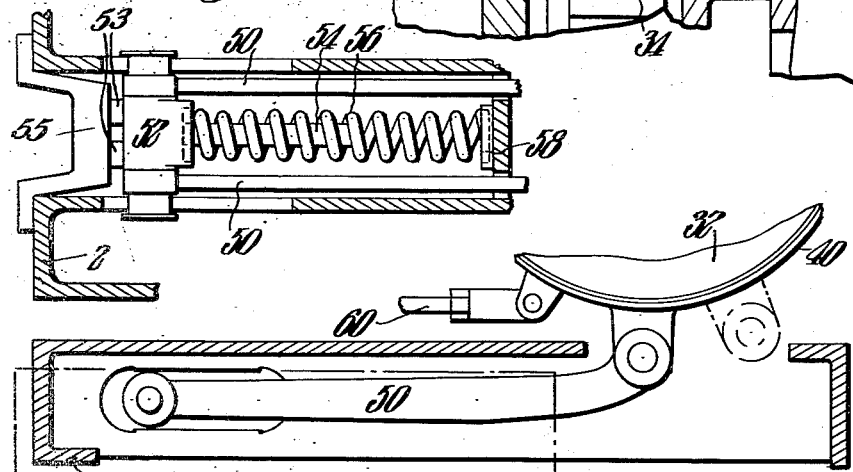
INVENTOR.
Almon A. Johnson.
BY Walter C. Ross, Attorney.

Patented Nov. 12, 1946

2,411,094

UNITED STATES PATENT OFFICE 2,411,094

WINCH FOR TOWING AND THE LIKE

Almon A. Johnson, Forest Hills, N. Y.

Application September 9, 1941, Serial No. 410,121

5 Claims. (Cl. 254—172)

This invention relates to improvements in winch apparatus and is directed more particularly to winch apparatus characterized by its adaptability, among other purposes, for towing, as where one vessel is towed by another.

The principal objects of the invention reside in the provision of winch apparatus adapted, as when towing one vessel by another, to pay out the tow-line when it is subjected to abnormal strains and to recover the payed-out line when the strain becomes normal.

Where one vessel is towed by another with a tow-line which is merely made fast to the towing vessel and extends to the towed vessel, the line is subjected to severe strains for various reasons and this oftentimes results in parting of the line.

According to this invention, the winch apparatus is constructed and arranged in such a manner that when the strain or pull on the tow-line exceeds a normal predetermined pull, as when a surge occurs, the line is payed out to accommodate the excess strain; when the strain is reduced to normal, the length of line payed out is recovered again. Should a subsequent surge occur while the line is being recovered or reclaimed, the line is payed out again until the strain or pull becomes normal and then all of the line payed out is reclaimed.

In that way the line payed out to accommodate a surge or successive surges is recovered. It is possible to provide a predetermined length of line extending between the vessels under conditions of normal strain or pull, yet when a surge or surges occur the line is payed out to accommodate the excess pull thereby to obviate the usual consequences resulting from abnormal strains on the tow-line, and the payed-out line is recovered on normal conditions of strain to provide the predetermined length of line.

The novel objects of the invention are accomplished in a broad way by the provision of a cable drum for the tow-line which operates, as the strain or surge on the line exceeds a predetermined normal to rotate a brake drum and thereby to actuate a frictionally-engaged band which controls the function of the apparatus.

In a general way, as the brake band is actuated, the brake of an electric motor is released and the drum pays out the cable and operates a reclaiming mechanism which controls the motor for operating the drum in such a way that the torque of the motor increases accordingly as the line is payed out so that the pull or strain on the line is resisted by the motor torque. When the strain or pull on the line assumes the predetermined normal, the motor then operates the cable drum to take up or reclaim the line payed out and when reclaimed, the brake band assumes normal position again. In a broad way, when a surge on the line occurs the motor is overhauled against its normal direction of rotation until sufficient torque is built up to stop it and cause the line to be recovered.

More specific and detailed objects, advantages, and functions of the apparatus will be observed from the following description of the apparatus of the invention. Various changes and modifications may be made in the form of the apparatus without departing from the spirit and scope of the invention wherefor the form to be described is for purposes of disclosure only.

In the drawings:

Fig. 3 is a fragmentary sectional view through one end of the line drum and brake drum;

Fig. 4 is a sectional view through the frame at the lower side of the brake drum;

Fig. 5 is a sectional plan view on the line 5—5 of Fig. 4;

Fig. 6 is a plan view of the reclaiming control mechanism; and

Fig. 7 is a diagrammatic view showing one form of electrical mechanism of the winch.

Figure 2:
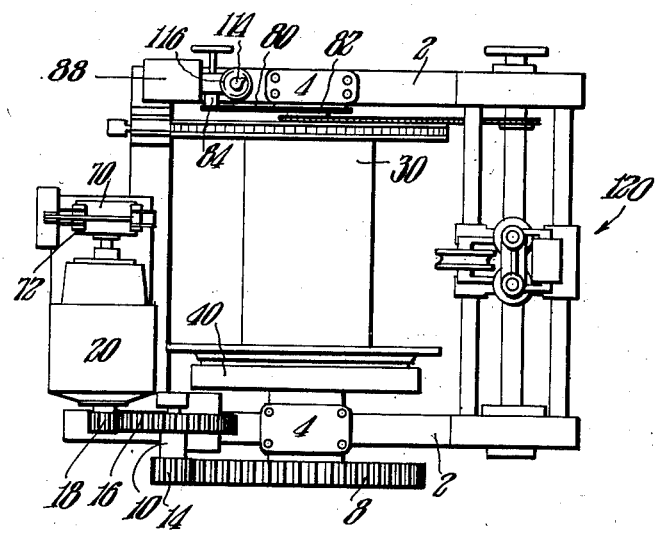
Fig. 2 is a plan view of the same.
Figure 1:
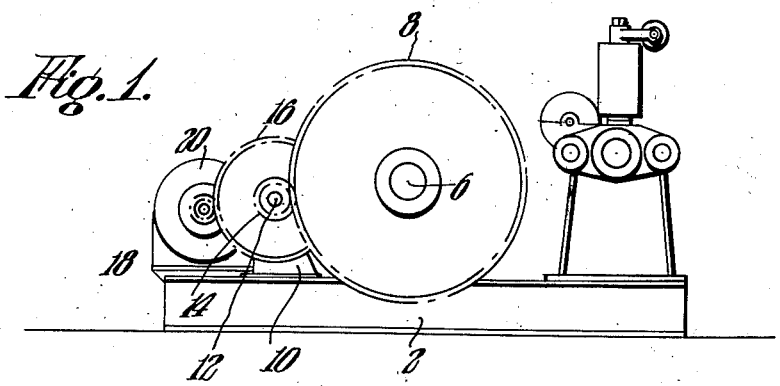
Fig. 1 is a side elevational view of a winch apparatus embodying the novel features of the invention.

Referring now to the drawings more in detail, the invention will be fully described. It will be understood that the construction shown is for purposes of disclosure only and that various changes in construction may be made without departing from the spirit and scope of the invention.

A supporting base is represented by 2 which may be of any desired form and on which are mounted in spaced relation bearings such as 4. A shaft 6 is rotatable relative to the bearings and has a gear 8 thereon.

A bearing 10 has a shaft 12 journalled therein and has a pinion 14 fixed thereto which is in mesh with the gear 8. A gear 16 on said shaft 12 meshes with a pinion 18 of a motor 20.

A cable or line drum 30 is mounted for rotation relative to the shaft 6 by means of bearing 31, as is a brake drum member 32 by means of bearing 33, as shown in Fig. 3. A sun gear 34 fixed on shaft 6 and an internal gear 35 associated with the brake member 32, are in mesh with one or more planetary gears 36 which may be rotatably mounted on member 30 as by a stud 38 associated with said cable drum member 30.

As in U. S. Letters Patent No. 1,946,145, the shaft 6 may be rotated and the brake member held against rotation to rotate the cable drum 30.

A brake band 40 is in frictional engagement with the brake drum 32 and any suitable means may be provided for adjusting the said band, so that it offers more or less resistance to the rotation of the brake drum.

As shown in Figs. 4 and 5, the brake band 40 is yieldingly held against rotation by means of links 50 connected to the lower side thereof that are connected at their free ends to a spring compressor 52.

The compressor 52 has a member 54 extending therefrom into a compression spring 56 disposed between member 52 and a part 58 associated with the base 2. Bumpers 53 are associated with a bracket 55 secured to the base to limit movement of said member 52 to the left in Fig. 5. Any other means may, of course, be employed and the parts are arranged to offer a predetermined resistance to counterclockwise movement of the brake band 40 and thereby of the brake drum 32. A member 60 is pivoted to the brake band which may take any form and is intended when the brake band moves to operate certain control mechanism as will appear. This member 60 may take any form and may be connected to the brake drum 32 instead of the band 40, if desired.

Figures 6, 7:
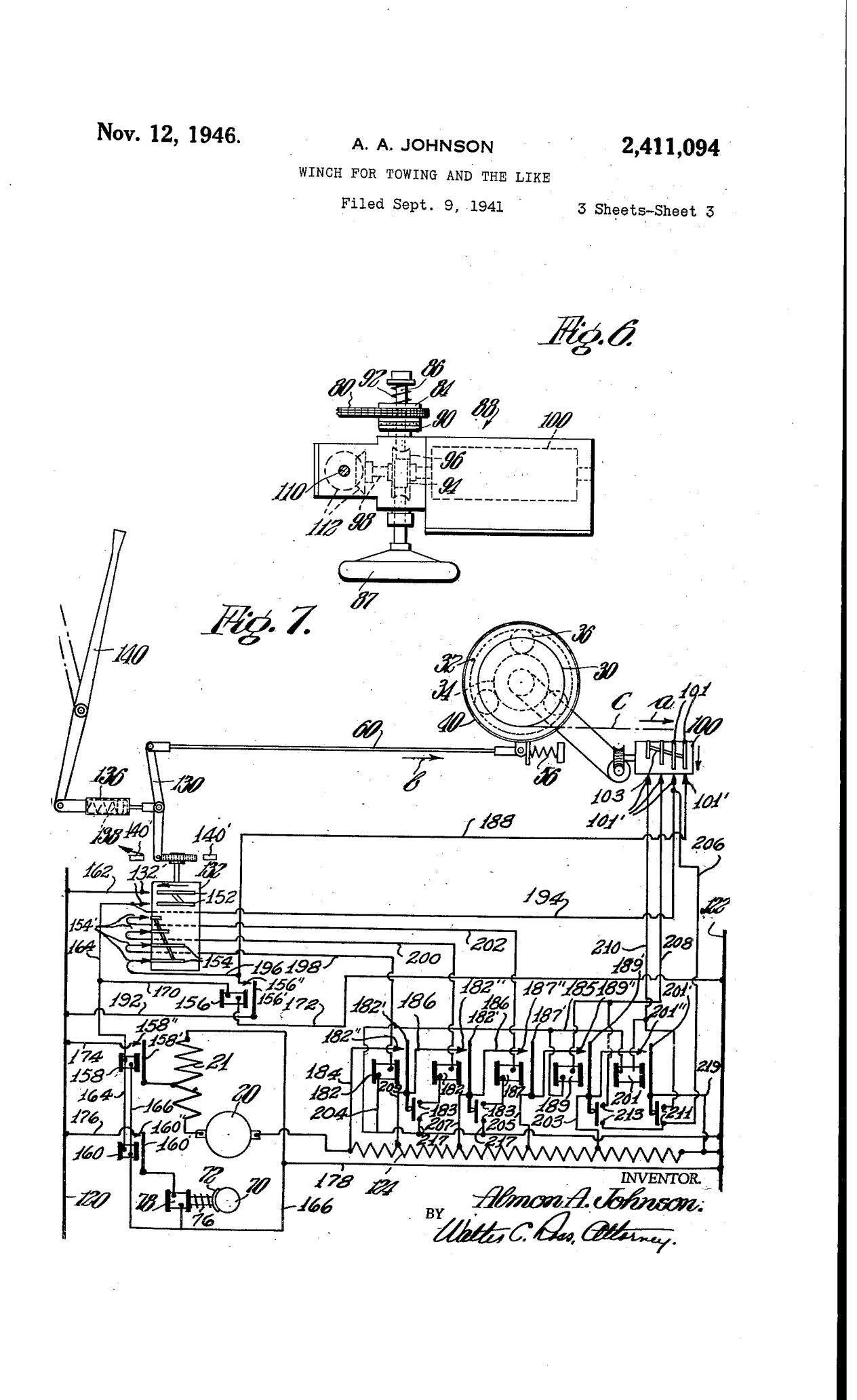

A brake drum 70 is provided on the shaft of motor 20 and a brake band 72 in operative frictional engagement therewith is actuated by a spring 76 and released by a solenoid 78, see Fig. 7.

A chain 80 engages a sprocket 82 of shaft 6 and a sprocket 84 is rotatable on a shaft 86 of a reclaiming control mechanism 88. The sprocket 84 is urged into frictional engagement with a disc 90 fixed on shaft 86 by a spring 92 to constitute a clutch mechanism.

A worm 94 on the shaft 86 meshes with a worm gear 96 of a shaft 98 on which is a drum 100. As the cable drum 30 rotates in paying out the cable the drum 100 is rotated and is made use of for reclaiming or controlling the function of reclaiming. The drum 100 carries a plurality of electrical contacts 101 connected by 103 that engage their respective contacts represented by arrows, as shown in Fig. 7.

The friction clutch associated with the drive mechanism for the drum is intended to function should the length of cable payed out be too great, as when the drum 100 would be rotated beyond its operative range.

A shaft 110 driven by gears 12 associated therewith and with shaft 98 is provided on which is an index member 114 adapted to register with a dial 116, see Figs. 2 and 6. This mechanism may be arranged to indicate the length of cable paid out by the cable drum during a surge or surges.

According to the invention it is desired that a certain length of cable extend from the cable drum to the vessel being towed and that said length be substantially maintained under some normal predetermined strain or pull on the cable but that when a surge occurs, such as when the normal strain is exceeded, the cable be payed out to accommodate the strain and that the payed out cable be recovered or reclaimed when the strain is again reduced to normal.

Under normal strain of the cable the operation in general is as follows:

The motor 20 is held against rotation by the brake 72 and thereby, through gears 8, 14, 16 and 18, the shaft 6 is held. The brake drum 32 is held against rotation by band 40, the movement of which is resisted by the yielding means such as spring 56.

The cable drum connected to the shaft 6 and brake drum through the planetary gear system is held against rotation since the shaft 6 and the brake drum are held. This condition obtains until the pull or surge on the cable is sufficient to cause the cable drum to act through the planetary system on the brake drum to move it against the yielding means 56 or overcome the resistance thereof. Thus the yielding means determines the normal pull or strain.

The yielding means may be varied within wide limits and functions to resist paying out rotation of the cable drum 30. The yielding means determines the normal predetermined strain on the cable and a strain in excess thereof called a surge brings about the paying out of the cable to accommodate the surge and the subsequent reclaiming or recovering of the cable paid out until the certain predetermined length is again established.

When a surge occurs on the cable C in the direction of arrow A (see Fig. 7) since shaft 6 is held against rotation, the tendency of the cable drum to rotate will, through the planetary gearing 34, 35 and 38 bring about rotation of the brake drum 32 so that it moves the brake band against the action of the yielding means 56, the surge overcoming the resistance of the said yielding means. In the illustration of Fig. 7 when the brake band moves, it moves counterclockwise to act on member 60 in the direction of arrow B.

As the brake band moves, the member 60 is caused to function in conjunction with the control mechanism to energize the solenoid 78 and release the motor brake. The motor is then free, as is shaft 6, while the brake drum is of course held by the brake band so that rotation of either the cable drum 30 or of the shaft 6 brings about rotation of the other through the planetary gearing.

The cable during the surge rotates the cable drum so that cable is payed out and said drum through the planetary gearing, since the brake drum is held, acts on the shaft 6 which in turn through gears 8, 14, 16 and 18 acts on the motor 20. The rotation of the cable drum to pay out the cable also brings about rotation of the reclaiming drum 100.

In the initial paying out of the cable due to a surge and the rotation of the cable drum, the consequent torque of the motor 20 is reduced below normal but as the paying out continues the motor torque increases so as to progressively resist rotation of the drum and the paying out of the cable. When the torque of the motor overcomes the strain on the cable or the strain thereon is again normal the motor is rotated so as to rotate the cable drum for rewinding and reclaiming the cable payed out.

It is intended that there be a reclaiming action following each surge and that the cable be payed out to accommodate a surge which may follow a prior surge with subsequent reclaiming. While the cable is being reclaimed following a surge the mechanism operates to pay out cable to accommodate a surge during that reclaiming period so that at all times cable is payed out and reclaimed as conditions demand.

There may be means for guiding the cable onto the cable drum which is indicated generally by 120 but forms no part of the present invention.

The mechanism and circuit operable to release the motor brake and provide for the motor torque may take various forms but for purposes of disclosure, the arrangement of Fig. 7 will suffice. In this figure which is diagrammatic the drum 30, brake drum 32 and brake band 40, are shown as are the drum 100 and the circuits connecting the motor 20 and motor brake 72 to a supply indicated by 120 and 122.

There are various relays for opening and closing circuits in conjunction with a resistor 124 to provide the torque requirements described.

The drum 132 has interconnected circumferential contacts 152 for contacting with contacts, represented by the arrows 132' as shown in Fig. 7 when the drum 132 is rotated. Other circumferential contacts 154 on the drum 132 are interconnected as shown and in the rest position of said drum are in contact with their respective contacts represented by the arrows 154' shown. These contacts 154 are of different lengths.

A power line is represented by 120 and 122. Relay switches are shown at 156, 158, and 160, each having movable circuit closing members 156', 158' and 160' engageable with contacts represented by arrows 156'', 158'', 160'' as shown. The field of the motor 20 is represented by 21.

A contact 132' for one of the contacts 152 of drum 132 is connected by 162 to power line 120. The other contact 132' is connected by 164 to relays 158 and 160. The other connection of said relays is by 166 to the motor field and to the motor brake solenoid 78. Relay 156 is connected to the power line 120 and 122 by 170 and 172. The contacts 158'' and 160'' of relays 158 and 160 are connected by 174 and 176 to line 120.

A connection 178 extends from 166 to power line 122. The resistance 124 is connected to line 122 and motor 20. Relay switches such as 182 have swingable switch arms 182', as shown, that are engageable at upper ends with upper contacts represented by arrows 182''. The lower ends of the arms 182' carry circuit closers, as shown, for engaging contacts 183 adjacent thereto. The upper contacts 182'' of the left hand relay 182 is connected by 184 to one end of the resistance 124. A connection 188 extends from contact 156'' of relay 156 to a contact for the right end segment 101 of drum 100. The swingable member 156' of said relay 156 is connected by 192 to power line 120.

Relays 187, 189 and 201 have swingable arms 187', 189' and 201' for making upper contacts 187'', 189'' and 201''. Said contacts 201'', 189'', 187'' and contact 182'' are connected by 203, 205, 207 and 209 to the resistance 124 in each case through the arms of the relays at the left thereof and said connections divide the resistance 124.

Lower ends of relay arms 201' and 189' are engageable with contacts 211 and 213. Relays 201, 189, and the second relay 182 from the left are connected together by 185 and to a contact 183 of said relay 182. Contacts 183 of the two leftmost relays 182 are connected by 217 to 204. The arm 201' of relay 201 is connected by 219 to right-hand end of resistance 124.

A connection 194 extends from one contact 152 of drum 132 to a contact 101' of drum 100. A connection 196 extends from 188 to a contact 154' for a segment of drum 132. Connections 198, 200, and 202 extend from other contacts 154' for segments of drum 132 to relays 182, 182 and 187, as shown.

The relay 182 at the left is connected by 204 to line 122. One of the contacts 101' for a second segment of drum 100 is connected by 206 to contacts 211 and 213 of the two right-hand relays 201 and 189. The contact of the third segment contact 101' is connected by 208 to the second relay 189 and to a contact 213 thereof. A connection 210 extends from the remaining contact 101' for drum 100 to the right hand relay 201 and a contact 211 thereof.

As a special feature of the invention, there is tension control means including a lever 130 operatively connected as by a rack and gear (as shown) to a drum 132. Lever 130 is fulcrumed on a rod on which a housing 136 is reciprocable with a spring 138 therein. A lever 140 connected to the housing may be swung to the left to act on the fulcrum through the spring 138. The drum 132 carries contacts and through the connections, to be described the motor is controlled as and for the purpose described. There may be a stop mechanism associated with the drum 132 so that with spring 56 compressed, the lever 140 in moving to the left will cause the spring 138 in tube 136 to be compressed. The stop mechanism may include stop members or abutments 140' engageable by the rack which rotates drum 132.

The operation of the apparatus is, briefly, as follows:

As has been described, the motor 20 is normally held against rotation by its brake so that the shaft 6 is also held through the connecting gearing. The brake drum 32 is frictionally held by the band 40, movement of which band is resisted by spring means 56.

When a surge on the cable occurs to move it in direction of arrow a thereby to rotate the cable drum, it acts through the planetary gearing to rotate the brake drum 32 counterclockwise which through friction acts on band 40 to move rod 60 to the right in direction of arrow b. Rod 60 swings lever 130 clockwise and it through the rack and pinion rotates tension control drum 132. The rotation of the cable drum in paying out cable to accommodate the excessive strain or surge also rotates the reclaiming drum 100.

As automatic tension control drum 132 rotates and with its contacts 152 and 154 engaging their respective contacts 132' and 154' relay 156 is energized through 162, 164, 170 and 172, and relays 158 and 160 are energized through 162, 164, 166 and 178.

Operation of relay 160 closes circuit including 166 and 176 to motor brake solenoid 78 freeing the motor 20. Operation of relay 158 connects the motor 20 to power lines 120 and 122.

Also leftmost relay 182 is energized through 198 and 204 so that its arm 182' makes its contact 182'' to establish a circuit including 182', 184 and 209 and connecting contacts 183 thereby energizing the adjacent relay 182 through said contacts 183 and 200. This closes arm 182' of the second relay 182 whereby relay 187 is energized through 202 and contacts 183. The arms 182' and 187' of the three leftmost relays complete circuits including portions of the resistance through connections 184, 209, 207 and 205.

As reclaiming drum rotates, its two righthand contacts 101 engage their respective contacts 101' to complete a circuit including 188, arm 156' of relay 156, connections 192, 194, 164, 166, 178. Thus relays 156, 158 and 160 are energized so long as the aforesaid contacts 101 and 101' are in engagement thereby to maintain the motor and its brake solenoid connected to the power line.

The movement of the rod 60 is such to rotate the drum 132 to the extent the contacts 154 run off of or beyond their contacts 154' and they remain in that position until the strain on the cable again becomes normal and the drum 132 rotates back to its normal position.

As cable is paid out so that the cable drum rotates the reclaiming drum, however, additional contacts 101 thereof engage their respective contacts 101'.

When the third contact 101' from the right of drum 100 engages its contact 101' relay 189 is energized through 208 and 185 so that its arm 189' closes a circuit including 205, 203 and a portion of resistance to the motor whereby the torque of the motor is increased. Should drum 100 be further rotated by the paying out of cable so that the leftmost contact 101 engages its contact 101' relay 201 is energized through 210 and 185 whereupon its arm 201' closes a circuit including 203, 219 a portion of resistance 124 and a connection 213 from arm 201' to 124 whereby the motor has additional torque.

Ordinarily a surge calling for the paying out of cable will be such as to cause the strain on the cable or the cable pull to overhaul the motor during the beginning of the paying out period. The reclaiming drum and means operated thereby are such as to increase the torque of the motor while cable is being paid or until the motor torque overcomes the strain and brings about reclaiming of the cable.

The apparatus is constructed and arranged so that sufficient cable will be paid out to accommodate any ordinary strain thereon while torque is decreased to accommodate for the strain and reclaim the paid out cable.

When the strain on the cable paid out is overcome, the motor through the gearing rotates the cable drum for winding up the cable, the reclaiming drum being rotated in a reverse direction by said cable drum.

When the paid out cable has been reclaimed the contacts 101 and 101' are disengaged and when the strain on the cable becomes normal the spring means 56 acts on the brake band and rod 60 to return the drum 132 to its normal position, thereby breaking contacts 132' and 154' so that the motor stops and the brake therefor is applied.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A full automatic towing winch apparatus comprising in combination, a motor and an electric motor brake to hold the motor against rotation when de-energized, a cable-drum having a cable thereon and rotatable in opposite paying-out and reclaiming directions, connections between said motor and cable-drum whereby either may rotate the other, a brake drum associated with said connections, a brake band frictionally engaging and movable by said brake drum, tension means resisting movements of the brake band in one direction as the cable tends to rotate the cable drum in paying out direction under a certain pull on the cable and yieldable to permit the brake band to move in said one direction when said certain pull is exceeded as by a surge to demand paying out of cable, a source of electrical energy, control means, circuit means connecting said motor and motor-brake and said source of energy and control means, resistance means in said circuit means, and mechanical connections between said brake band and control means whereby as the certain pull on the cable is exceeded by a surge to bring about movement of the brake band in said one direction said control means is moved in pay-out direction and said motor and electric brake are connected in the circuit means so that said surge initially overcomes the torque of the motor and the paying out of cable brings about counter torque of the motor to oppose paying out of the cable thereby to snub the same when the peak of the surge has passed and to rotate the cable drum in reclaiming direction.

2. A full automatic towing winch apparatus comprising in combination, a motor and an electric motor brake to hold the motor against rotation when de-energized, a cable-drum having a cable thereon and rotatable in opposite paying-out and reclaiming directions, connections between said motor and cable-drum whereby either may rotate the other, a brake drum associated with said connections, a brake band frictionally engaging and movable by said brake drum, tension means resisting movements of the brake band in one direction as the cable tends to rotate the cable drum in paying out direction under a certain pull on the cable and yieldable to permit the brake band to move in said one direction when said certain pull is exceeded as by a surge to demand paying out of cable, a source of electrical energy, control means, circuit means connecting said motor and motor-brake and said source of energy and control means, resistance means in said circuit means, and mechanical connections between said brake band and control means whereby as the certain pull on the cable is exceeded by a surge to bring about movement of the brake band in said one direction said control means is moved in pay-out direction and said motor and electric brake are connected in the circuits so that said surge initially overcomes the torque of the motor and the paying out of cable brings about counter torque of the motor to oppose paying out of the cable thereby to snub the same when the peak of the surge has passed and to rotate the cable drum in reclaiming direction, and means associated with said mechanical connections for controlling the point at which a surge in excess of said certain pull to bring about movement of the brake band will operate said control means.

3. A full automatic towing winch apparatus comprising in combination, a motor and an electric motor brake to hold the motor against rotation when de-energized, a cable-drum having a cable thereon and rotatable in opposite paying-out and reclaiming directions, connections between said motor and cable-drum whereby either may rotate the other, a brake drum associated with said connections, a brake band frictionally engaging and movable by said brake drum, tension means resisting movements of the brake band in one direction as the cable tends to rotate the cable drum in paying out direction under a certain pull on the cable and yieldable to permit the brake band to move in said one direction when said certain pull is exceeded as by a surge to demand paying out of cable, a source of electrical energy, a tension controller and a reclaiming controller, resistance means, interconnected circuit means connecting said motor and motor brake and said controllers and resistance means, and mechanical connections between said tension controller and brake band and driving connections between said cable drum and reclaiming controller whereby as the certain pull on the cable is exceeded by a surge to bring about movement of the brake band in said one direction said motor and electric brake and controllers are connected in said circuits so that said surge initially overcomes the torque of the motor and the paying out of cable through said resistance means brings about counter torque of the motor to oppose paying out of cable and snub the same when the peak of the surge has passed and to rotate the cable drum in reclaiming direction.

4. A full automatic towing winch apparatus comprising in combination, a motor and an electric motor brake to hold the motor against rotation when de-energized, a cable-drum having a cable thereon and rotatable in opposite paying-out and reclaiming directions, connections between said motor and cable-drum whereby either may rotate the other, a brake drum associated with said connections, a brake band frictionally engaging and movable by said brake drum, tension means resisting movements of the brake band in one direction as the cable tends to rotate the cable drum in paying out direction under a certain pull on the cable and yieldable to permit the brake band to move in said one direction when said certain pull is exceeded as by a surge to demand paying out of cable, a source of electrical energy, a tension controller and a reclaiming controller, resistance means, interconnected circuit means connecting said motor and motor brake and said controllers and resistance means, and mechanical connections between said tension controller and brake band and driving connections between said cable drum and reclaiming controller whereby as the certain pull on the cable is exceeded by a surge to bring about movement of the brake band in said one direction said motor and electric brake and controllers are connected in said circuits so that said surge initially overcomes the torque of the motor and the paying out of cable through said resistance means brings about counter torque of the motor to oppose paying out of cable and snub the same when the peak of the surge has passed and to rotate the cable drum in reclaiming direction, and slip clutch means in the driving connections between the cable drum and reclaiming controller whereby the operation of the former relative to the latter may be limited.

5. A full automatic towing winch apparatus comprising in combination, a motor and an electric motor brake to hold the motor against rotation when de-energized, a cable-drum having a cable thereon and rotatable in opposite paying-out and reclaiming directions, connections between said motor and cable-drum whereby either may rotate the other, a brake drum associated with said connections, a brake band frictionally engaging and movable by said brake drum, tension means resisting movements of the brake band in one direction as the cable tends to rotate the cable drum in paying out direction under a certain pull on the cable and yieldable to permit the brake band to move in said one direction when said certain pull is exceeded as by a surge to demand paying out of cable, a source of electrical energy, a tension controller and a reclaiming controller, resistance means, interconnected circuit means connecting said motor and motor brake and said controllers and resistance means, and mechanical connections between said tension controller and brake band and driving connections between said cable drum and reclaiming controller whereby as the certain pull on the cable is exceeded by a surge to bring about movement of the brake band in said one direction said motor and electric brake and controllers are connected in said circuits so that said surge initially overcomes the torque of the motor and the paying out of cable through said resistance means brings about counter torque of the motor to oppose paying out of cable and snub the same when the peak of the surge has passed and to rotate the cable drum in reclaiming direction, slip clutch means in the driving connections between the cable drum and reclaiming controller whereby the operation of the former relative to the latter may be limited, and means associated with said mechanical connections for controlling the point at which a surge in excess of said certain pull to bring about movement of the brake band will operate said tension controller.

ALMON A. JOHNSON.